US006999498B2

(12) United States Patent
Mills et al.

(10) Patent No.: US 6,999,498 B2
(45) Date of Patent: Feb. 14, 2006

(54) MULTIUSER DETECTION AIDED MULTIPLE ACCESS DIFFERENTIAL FREQUENCY-HOPPED SPREAD SPECTRUM

(75) Inventors: Diane G. Mills, Wilmington, MA (US); Geoff S. Edelson, Andover, MA (US); Dianne E. Egnor, Somerville, MA (US)

(73) Assignee: BAE Systems Information and Electronic Systems Integration INC., Nashua, NH (US)

(*) Notice: Subject to any disclaimer, the term of this patent is extended or adjusted under 35 U.S.C. 154(b) by 0 days.

(21) Appl. No.: 10/482,598

(22) PCT Filed: Aug. 7, 2003

(86) PCT No.: PCT/US03/24920

§ 371 (c)(1),
(2), (4) Date: Apr. 22, 2005

(87) PCT Pub. No.: WO2004/098141

PCT Pub. Date: Nov. 11, 2004

(65) Prior Publication Data

US 2005/0220174 A1    Oct. 6, 2005

Related U.S. Application Data

(63) Continuation-in-part of application No. 10/422,340, filed on Apr. 24, 2003, now Pat. No. 6,954,482.

(60) Provisional application No. 60/465,026, filed on Apr. 24, 2003.

(51) Int. Cl.
*H04L 27/30* (2006.01)

(52) U.S. Cl. .................. 375/133; 375/136; 375/349; 455/303

(58) Field of Classification Search ................ 375/132, 375/133, 136, 144, 148, 262, 265, 267, 346, 375/349; 455/52.3, 65, 296, 303
See application file for complete search history.

(56) References Cited

U.S. PATENT DOCUMENTS

| 5,048,057 | A | * | 9/1991 | Saleh et al. ................ 375/267 |
| 5,193,102 | A | | 3/1993 | Meidan et al. |
| 5,483,550 | A | | 1/1996 | Hulbert |
| 5,745,187 | A | | 4/1998 | Hulyalkar et al. |
| 6,201,563 | B1 | | 3/2001 | Rhee |
| 6,278,723 | B1 | * | 8/2001 | Meihofer et al. ........... 375/133 |
| 6,345,073 | B1 | | 2/2002 | Curry et al. |
| 6,704,376 | B1 | | 3/2004 | Mills et al. |

OTHER PUBLICATIONS

Lee, P.K. et al, "Capacity Enhancement for Correlated Frequency Hopping Systems", ATIRP,1997, pp1-6.
Lee, P.K. et al, "Spectrum Efficient HF System for Mobile Long Haul Communications", ATIRP,1999, pp1-5.

(Continued)

*Primary Examiner*—Dac V. Ha
(74) *Attorney, Agent, or Firm*—Maine & Asmus

(57) ABSTRACT

Techniques for multiple access differential frequency-hopped spread spectrum (MA-DFHSS) aided by multiuser detection (MUD) are disclosed. An initial DFH decoding is performed to provide data estimates for each user represented in a received co-channel signal. Interference cancellation is then performed using MUD, thereby providing an interference-cancelled signal. Data estimates remaining are then re-decoded. Iteration on the interference cancellation and re-decoding can be carried out to satisfy a particular rule of iteration, although iteration is not always necessary. The final decoded signal can then be provided to its destination.

20 Claims, 8 Drawing Sheets

OTHER PUBLICATIONS

Robertson, Patrick et al, "A Comparison of Optimal and Sub-Optimal MAP Decoding Algorithms Operating in the Log Doman", IEEE, 1995, pp1009-1013.

Hagenauer, Joachim et al, "A Viterbi Algorithm with Soft-Decision Outputs and its Applications", IEEE, 1989, pp1680-1686.

Pottie, Gregory et al, "A Comparison of Reduced Complexity Decoding Algorithms for Trellis Codes", IEEE, Dec. 1989, pp1369-1380, vol. 7, No. 9.

Aulin, Tor et al, "Trellis Coded Multiple Access (TCMA)", IEEE, 1999, pp1177-1181.

PCT Search Report dated Dec. 12, 2003 of Patent Application No. PCT/US03/24920 filed Aug. 7, 2003.

PCT Search Report dated Sep. 1, 2004 of Patent Application No. PCT/US04/12414 filed Apr. 22, 2004.

PCT Search Report dated Jan. 12, 2005 of Patent Application No. PCT/US04/12483 filed Apr. 21, 2004.

* cited by examiner

MULTIUSER DETECTION AIDED MULTIPLE ACCESS DIFFERENTIAL FREQUENCY-HOPPED SPREAD SPECTRUM

RELATED APPLICATIONS

This application claims the benefit of U.S. Provisional application No. 60/465,026, filed Apr. 24, 2003. In addition, this application is a continuation-in-part of U.S. application Ser. No. 10/422,340, filed Apr. 24, 2003 now U.S. Pat. No. 6,954,482, is a National Stage of International Application No. PCT/US03/24920, filed Aug. 7, 2003. Each of these applications is herein incorporated in its entirety by reference.

FIELD OF THE INVENTION

The invention relates to communications, and more particularly, to co-channel communications in multiple access differential frequency-hopped spread spectrum applications.

BACKGROUND OF THE INVENTION

Spread spectrum is a communications technique where the baseband signal bandwidth is intentionally spread over a larger bandwidth by modulating the signal with a higher-frequency "spreading" code prior to transmission. As a result, energy used in transmitting the baseband signal is spread over a wider bandwidth, and appears noiselike. The ratio between the spread baseband and the original signal is called processing gain. Typical Spread spectrum processing gains vary between 10 dB and 60 dB. A complementary de-spreading operation is performed at the receiver. Example spread spectrum techniques include frequency hopping (FH) and direct sequence spread spectrum (DSSS), each of which provide a reliable communications method for users.

In the presence of many users, however, co-channel interference degrades the performance of existing spread spectrum techniques. Media access control (MAC) must be implemented to reduce co-channel interference and to coordinate access to the channel by all interested, cooperating parties. In addition, it is desirable in some applications that the transmitted waveform has a low probability of detection (LPD) by unintended receivers, and that the transmitted waveform is resilient in the presence of jamming signals (i.e., AJ).

None of the existing spread-spectrum waveforms provide a signal that has suitable for LPD and AJ performance, while simultaneously allowing for conferencing without a MAC, and easy implementation. In addition, each known technique is associated with one or more disadvantages, such as wasteful use of bandwidth in DSSS, performance degradation in the presence of burst errors, and performance degradation in the presence of interference, both hostile and non-hostile.

The differential frequency-hopped (DHF) spread spectrum waveform and decoder combines trellis encoding concepts and frequency hopping (FH) techniques to provide improved LPD and AJ performance when compared to existing spread spectrum techniques. In addition, DFH spread spectrum techniques allow multiple users without a MAC and are relatively easy to implement.

What is needed, therefore, are techniques to implement a conferenced, multiple access operation of differential frequency-hopping, by combining both DFH and an iterative form of multiuser detection (MUD). This approach is extendible from frequency hopping to any M-ary coding scheme not fully utilizing its capabilities.

BRIEF SUMMARY OF THE INVENTION

One embodiment of the present invention provides a method for receiving (in a multiuser communication environment) a co-channel signal including a target-user differential frequency hopped (DFH) signal and one or more interfering other-user DFH signals. The method includes decoding the DFH signal, thereby providing soft-decision estimates of data bits included in the co-channel signal for each user. The method continues with removing estimated contributions of the interfering other-user DFH signals using multiuser detection (MUD), thereby providing an interference-cancelled signal. The method proceeds with re-decoding ambiguous data estimates remaining in the interference-cancelled signal.

The method may further include repeating the removing and re-decoding one or more times. Alternatively, or in addition to, the method may further include providing the re-decoded data estimates as final decoded data. In one particular embodiment, decoding the DHF signal includes detecting at least one frequency per a predetermined time interval of the co-channel signal, constructing a trellis model for each user using detected frequencies as nodes, and determining soft-decision estimates of data bits included in the co-channel signal for each user, using the corresponding trellis model.

Another embodiment of the present invention provides a method for receiving a differential frequency hopped (DHF) signal in a multiuser communication system. The method includes receiving a co-channel signal including a target-user DFH signal and one or more interfering other-user DHF signals, detecting at least one frequency per a predetermined time interval of the co-channel signal, constructing a trellis model for each user using detected frequencies as nodes, and determining soft-decision estimates of data bits included in the co-channel signal for each user, using the corresponding trellis model. This particular embodiment further includes removing estimated contributions of the interfering other-user DHF signals using multiuser detection (MUD), thereby providing an interference-cancelled signal. The method continues with re-decoding ambiguous data estimates remaining in the interference-cancelled signal.

In response to determining iteration is likely to improve the quality of the re-decoded data estimates, the method may further include repeating the removing and re-decoding. In response to determining iteration is not likely to improve the quality of the re-decoded data estimates, however, the method may include providing the re-decoded data estimates as final decoded data. Alternatively, the method may simply include repeating the removing and re-decoding one or more times, and/or providing the re-decoded data estimates as final decoded data.

In one particular embodiment, determining the soft-decision estimates includes generating estimates of the data bits based on a cumulative soft-valued metric, and/or providing a confidence value for each estimate. In another particular embodiment, the method further includes inferring missing nodes of the trellis model from existing nodes based on detected frequencies, and correcting for burst errors.

Another embodiment of the present invention provides a system (MUD-aided DFH receiver) for receiving in a multiuser communication environment a co-channel signal including a target-user differential frequency hopped (DFH) signal and one or ore interfering other-user DFH signals. The system includes an initial DFH decoding module and an interference cancellation and re-decoding module. The initial DFH decoding module is adapted to detect at least one frequency per a predetermined time interval of the co-channel signal, thereby enabling construction of a trellis model for each user using detected frequencies as nodes, and is also adapted to determine soft-decision estimates of data bits included in the co-channel signal for each user, using the corresponding trellis model. The interference cancellation and re-decoding module is operatively coupled to the initial DFH decoding module, and is adapted to remove estimated contributions of the interfering other-user DFH signals using MUD, thereby providing an interference-cancelled signal, and is also adapted to re-decode ambiguous data estimates remaining in the interference-cancelled signal.

In one such embodiment, the initial DFH decoding module includes a frequency detector for detecting the at least one frequency per a predetermined time interval of the co-channel signal, and one or more soft decision trellis decoders for determining the soft-decision estimates of data bits. Each soft decision trellis decoder can be further adapted, for example, to generate estimates of the data bits based on a cumulative soft-valued metric, and/or to provide a confidence value for each estimate. Each soft decision trellis decoder can be further adapted to infer missing nodes of trellis model from existing nodes based on the detected frequencies, and to correct for burst errors.

In another such embodiment, the interference cancellation and re-decoding module includes one or more multiuser detectors for removing the estimated contributions of the interfering other-user DHF signals for each user, and a corresponding soft decision trellis decoder operatively coupled to each multiuser detector, for re-decoding the ambiguous data estimates remaining in the interference-cancelled signal.

In another such embodiment, the system further includes an iteration controller that is operatively coupled to the interference cancellation and re-decoding module, and is adapted to provide the re-decoded data estimates for further processing by the interference cancellation and re-decoding module when appropriate, based on an iteration rule. In response to determining that iteration is not likely to improve the quality of the re-decoded data estimates, the iteration controller can provide the re-decoded data estimates as final decoded data.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention implement a conferenced, multiple access operation of differential frequency-hopping, by combining both DFH and an iterative form of multiuser detection (MUD). The described approach is extendible from frequency hopping to any M-ary coding scheme not fully utilizing its capabilities. For instance, it can be extended to hopping in time, code, phase, dwell time, etc., as well as hopping frequency.

Interfering DFH signals are decoded, thus removing the frequency detections that correspond to confidently decoded interfering symbols from the time-frequency detection matrix, and re-decoding the result. This process may continue iteratively until a iteration control determines that iterating is to stop (e.g., based on a predefined rule of iteration), then the decoded symbols for the desired user are output. The conferencing multiple access capabilities of the DHF spread spectrum waveform are significantly improved by using iterative multiuser decoding techniques.

DFH Transmitter

For DFH waveforms, the frequency of the transmitted tone depends on both the current data symbol and the previous transmitted tone. Thus, given a data symbol $X_n$ and frequency of the previous hop $F_{n-1}$, the frequency of the next hop is determined as: $F_n = G(F_{n-1}, X_n)$, where the function G can be viewed as a directed graph which has nodes corresponding to frequencies, and vertices labeled with input data patterns. Because the series of transmitted tones form a trellis, the receiver is able to make soft decisions on the data bit estimates, which provides for improved performance. Also, the waveform becomes difficult for unintended receivers to decode.

It has been shown that a communication system using a DFH-based waveform and trellis-based receiver outperforms standard frequency hopping (FH) and direct sequence spread spectrum (DSSS) under a variety of conditions, independently of frequency band. For instance, the receiver can reconstruct hops that are missing due to a fading channel or from collisions with other users. The trellis also allows for conferencing of multiple users for receivers that follow multiple trellises. Attempts to jam the waveform by fast-follow-on jammers can actually increase the strength of the received signal and improve performance of a DFH-based system.

Figure 1:
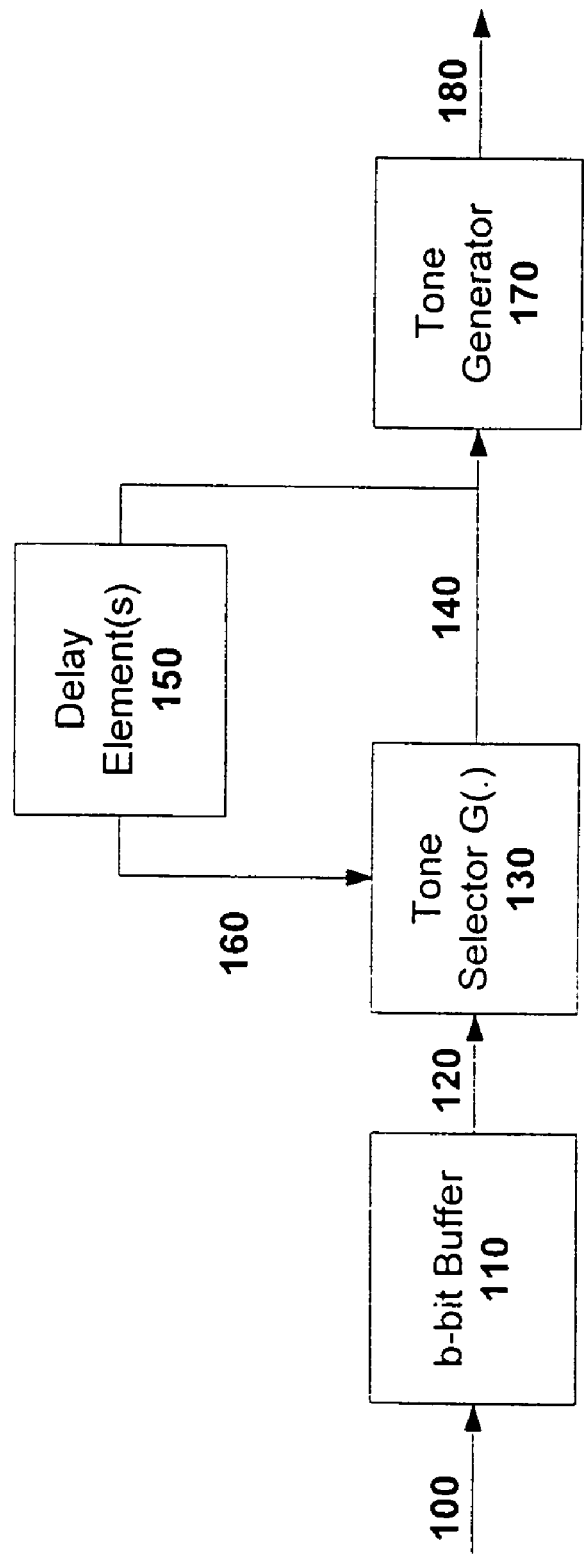
FIG. 1 illustrates a functional block diagram of a DFH transmitter configured to operate in accordance with an embodiment of the present invention.

FIG. 1 illustrates a function block diagram of a DFH transmitter configured in accordance with an embodiment of the present invention. The transmitter includes a b-bit buffer 110, a tone selector G(.) module 130, a number of delay elements 150, and a tone generator module 170. The transmitted tones form a trellis defined by the function G, as previously explained.

The data but stream from a data source is passed on input line 100 to the b-bit buffer 110, which collects b bits of the data stream. The value of b is the number of bits that are encoded within each frequency hop. The b-bit symbol is passed on line 120 to the tone selector G(.) module 130, which uses both the current b bits of data and at least one previously transmitted tone from line 160 to determine the current frequency selection. The current frequency selection is provided on line 140 to the tone generator module 170, which transmits the selected tone on line 180. The tone selection on line 140 is also passed to a delay module 150, for use in subsequent tone selections.

Each of these components can be conventionally implemented in hardware, software, firmware, or some combination thereof. For example, each module can be implemented as a set of software instructions executing on a digital signal processor or other suitable processing environment.

Figure 2:
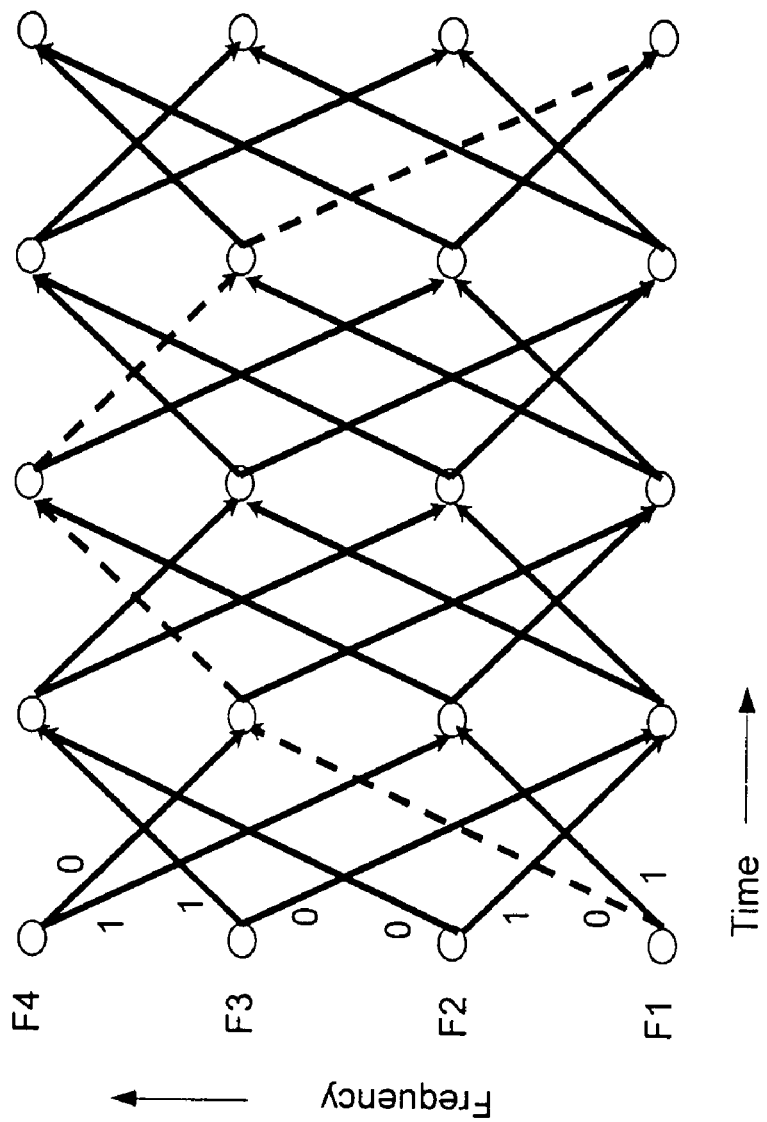
FIG. 2 is a graph illustrating an example trellis model for the transmitter illustrated in FIG. 1.

Trellis models, often used in depicting and analyzing convolutional codes, can readily be applied to a differential frequency-hopped signal, as shown in FIG. 2. While trellis models are the rule-based function used here to describe the frequency (tone) selection process in DFH, any other type of rule representation is also possible. As can be seen in FIG. 2, the vertical axis of the trellis corresponds to frequency, while the horizontal axis corresponds to time intervals. The set of states at any given time corresponds to the set of all possible frequencies that may be transmitted by the DFH system.

For a hopset of size M, there are M possible states at each stage in the trellis. The branches leaving each state terminate at the frequencies that are possible at the next hop given the current frequency state. A label on each branch indicates the encoded bits that corresponds to the transition from the current transmitted frequency to the next transmitted frequency.

For the trellis in FIG. 2, b=1 bit/hop, hopset size M=4, and the data sequence shown by dotted line is 0110. Note that the first detection at frequency 3, F3 corresponds to a 0 data bit and the second detection at F3 corresponds to a 1 data bit, which illustrates the DFH feature that the sequence of detections carry the information, and not the detections themselves, per se.

While FIG. 2 shows two axes, the number of axes for any given system is dependent on the number of identifying features (e.g., phase, amplitude, dwell time, duty cycle) that the system designer chooses to track. Although the description here specifically details transmitting data and determining a frequency value based on the current data and previous frequency values, the concept can be extended to apply to other properties or combinations of properties of the signal, including but not limited to, phase, coding, dwell, and duty cycle.

DFH Receiver—One Trellis

At the receiving node, the transmitted signal is received and passed to a frequency detector, where at least one frequency per a predetermined time interval is determined. The detected frequency is passed to a soft decision decoder that constructs a trellis model using the detected frequencies at nodes, estimates a data value according to the known trellis constraints of a transmitted signal, and outputs a data estimate.

Figure 3:
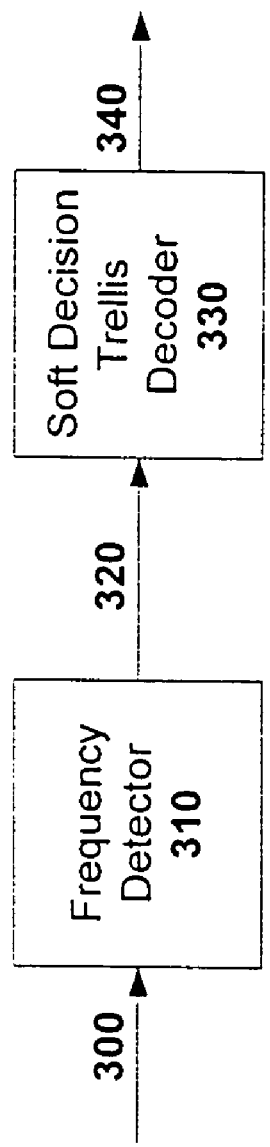
FIG. 3 is a block diagram illustrating a DFH receiver following one trellis, in a single user system.

FIG. 3 shows a DFH receiver following one trellis (i.e., decoding one transmitted signal). The receiver includes a frequency detector module 310 and a soft decision trellis decoder module 330. As can be seen, the received signal is passed on line 300 to the frequency detector module 310 (such as a spectrogram) that determines which frequency or frequencies are present during each time interval. The set of detected frequencies is provided at line 32 and passed to the trellis decoder module 330, which determines a soft-decision estimate of the transmitted data bits. This estimate is then provided at line 340.

The technique used in the trellis decoder 330 may be any trellis decoding techniques, such as those employed by Viterbi or maximum a posteriori (MAP) decoders.

The decoder 330 generates estimates of the data sequence based on a cumulative soft-valued metric. For instance, a soft-Viterbi decoder may be used which places the detected frequencies at each symbol interval on a trellis construction, and then the decoder 330 attempts to "connect" the detected frequencies according to known trellis constraints of the transmitted signal.

Burst errors are correctable because missing nodes on the trellis may be inferred from the existing nodes on the trellis (on both sides of the missing node or nodes) due to the trellis-encoded nature of the transmitted signal. Soft-decision decoding provides an estimate of the demodulated symbol as well as a confidence value for that estimate, and after some delay, the decoder 330 chooses the actual estimate. This process generally improves performance when compared to other modulation types and to hard-decision techniques.

DFH Receiver—Multiuser System

Figure 4:
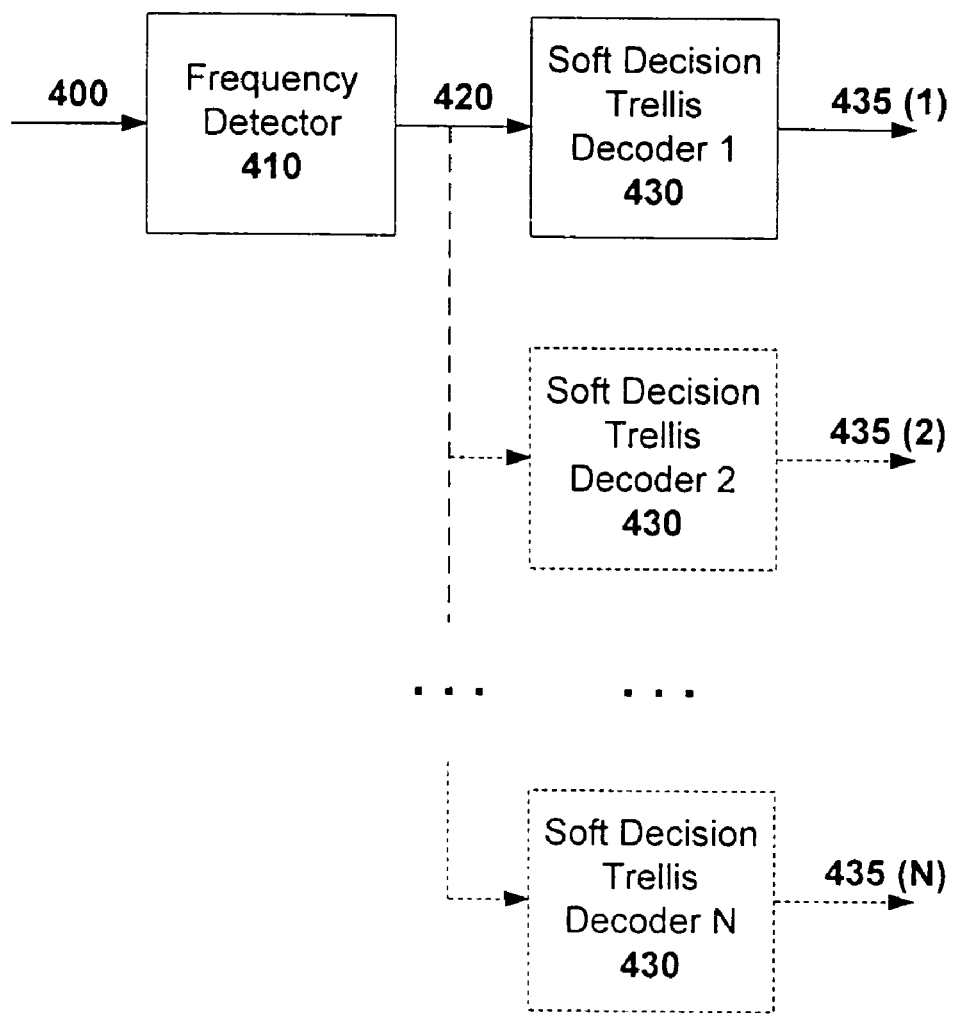
FIG. 4 is a block diagram illustrating a soft decision trellis decoding process in accordance with an embodiment of the present invention.

For a system in which the receiver is interested in demodulating signals from several users, the soft decision decoding is replicated for each desired signal. FIG. 4 is a block diagram illustrating a soft decision trellis decoding processing replicated for each desired signal in accordance with an embodiment of the present invention. Here, a frequency detector module 410 is operatively coupled by line 420 to a number (N) of decoder module 430.

Each decoder 430 represents the soft-decision trellis decoding process that is followed for each desired user (users 1 through N). Each decoder 430 is functionally identical, but decodes the received signal by using the trellis of the transmitting user of interest. In particular, a different trellis rule in accordance with the function $G_x(.)$, as previously discussed. This trellis decoding processing is further described in detail in related U.S. application Ser. No. 10/422,340, entitled "Soft-Decision Trellis-Coded Differential Frequency-Hopped Spread Spectrum (DFHSS)."

Figure 5:
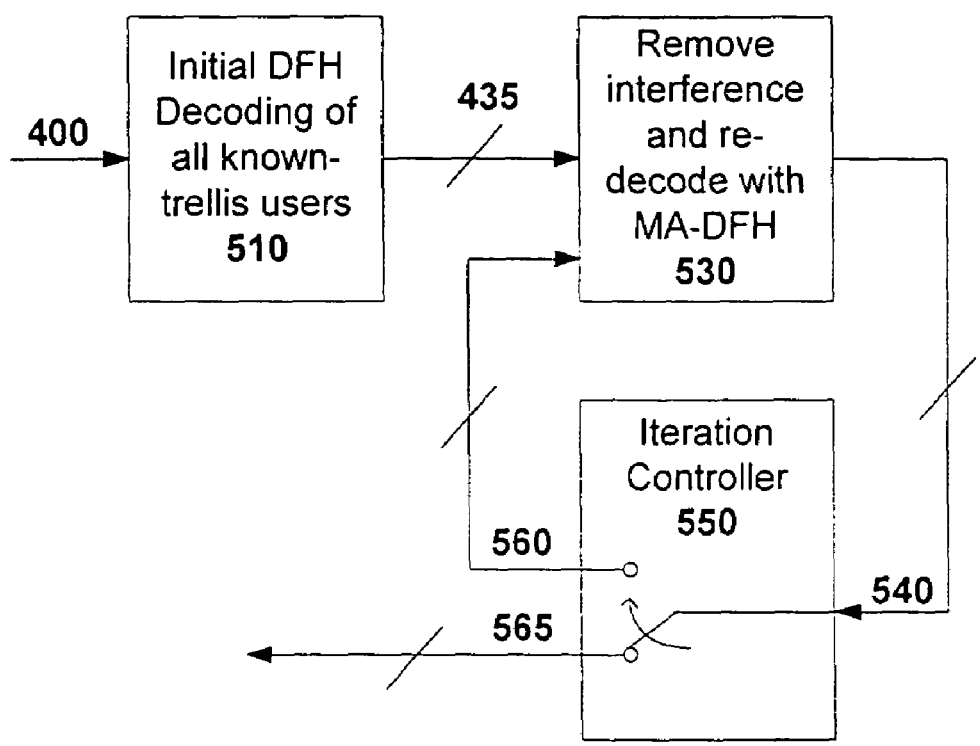
FIG. 5 is a functional block diagram of a MUD-aided DFH receiver configured in accordance with an embodiment of the present invention.

FIG. 5 is a functional block diagram of a MUD-aided DFH receiver configured in accordance with an embodiment of the present invention. The receiver includes an initial DFH decoder module 510, an interference cancellation and MA-DFH re-decode module 530, and in iteration controller module 550. It will be appreciated in light of this disclosure that a general MUD-aided DFH multiaccess (MA) transmitter model operates as a DFH transmitter. It will further be appreciated that a MUD-aided DFH approach in accordance with the principles of the present invention is best demonstrated and understood at the receiver, as is shown in FIG. 5.

As can be seen in FIG. 5, the received signal is provided on line 400 to the initial DHF receiver module 510, which detects all frequency detections for each time interval and trellis-decodes the receives frequency detections for each trellis that is known or might be potentially used to generate DFH sequences. Thus, the initial DFH receiver module 510 decodes the signal of interest as well as interfering DFH signals of all known-trellis users. Note that, in the embodiment illustrated, the process carried out by initial DFH receiver module 510 is represented in FIG. 4, and is described in detail in U.S. application Ser. No. 10/422,340.

For optimal interference cancellation at the later stages, a separate DHF detector can operate on the received signal for each active user, but improved performance will be seen even if only a subset of interfering transmissions are removed. After the initial DFH detection is performed by module 510, the successfully decoded symbols from interfering users are identified on line 435 and their contributions to the received matrix are removed in the interference cancellation section of module 530.

The MA-DFH section of module 530 then uses the modified received matrix to re-decode the ambiguous received values for the remaining detections in the time-frequency matrix. The updated decoded values are provided on line 540. If the iteration controller module 550 determines that iterating is not likely to improve the quality of the signal, the iterating process stops, and the symbols are output on line 565 as the final values. If the iteration controller module 550 determines that further iterations might be useful, the updated decoded values are passed on line 560 back to module 530, which again removes the frequency detections corresponding to successful decoded values for all of the interfering users, and re-decodes.

The iteration controller module 550 might, for example, count the number of iterations and stop after a pre-determined value, or it might compare previous decoded values to current decoded values and stop iterating if no change were made, or it might examine confidence values associated with the soft decoding done in module 530. Other predefined rules of iteration can be employed by module 550 as well. Further note that the iteration controller can also be configured to simply pass the decoded values through to the output at line 565 (if no iteration is desired). In any event, the decoded values can be effectively switched to a desired line (e.g., feedback output line and final value output line).

Figure 6A:
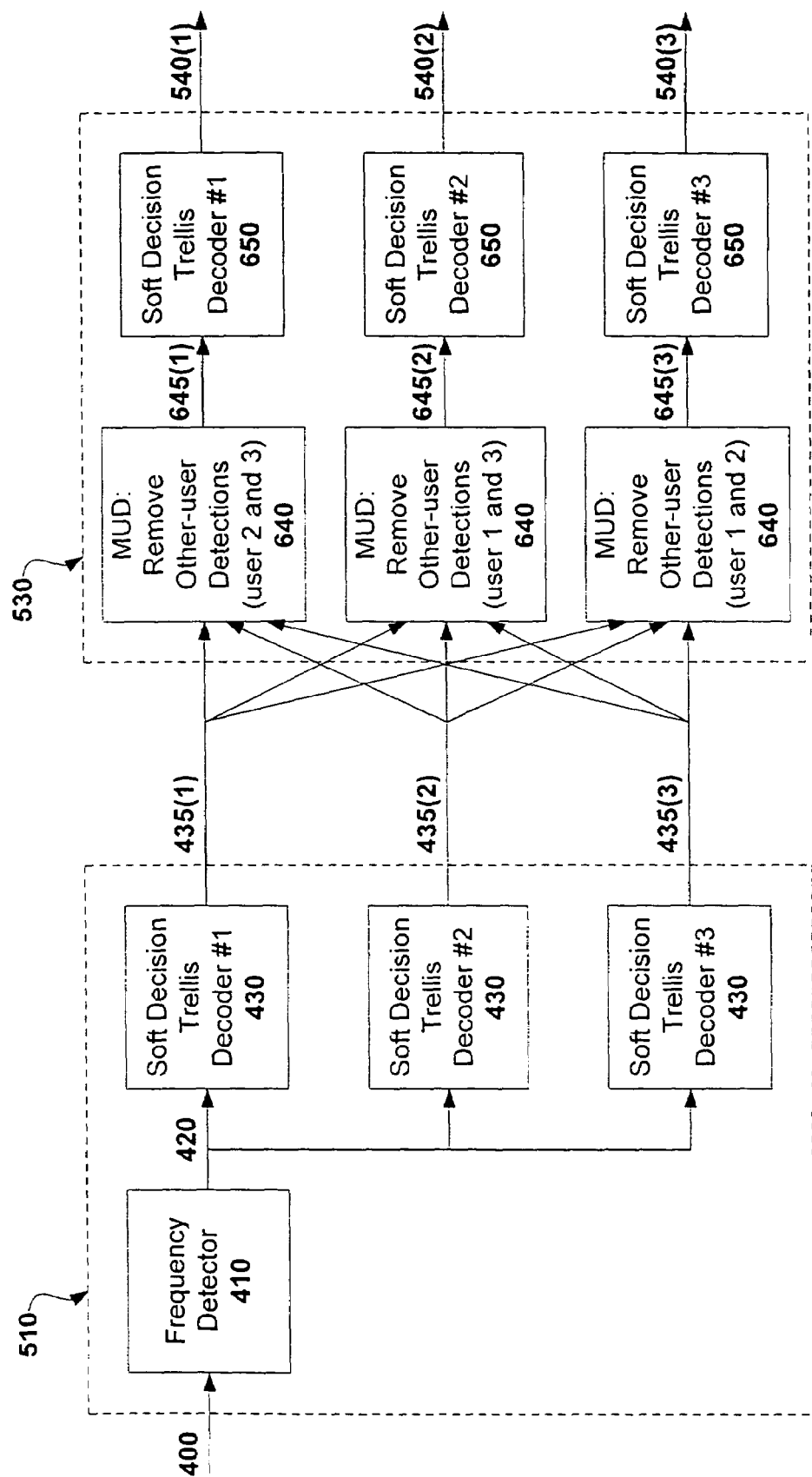
FIG. 6a is a detailed block diagram of a MUD-aided DFH receiver configured with no iteration in accordance with an embodiment of the present invention.

FIG. 6a is a detailed block diagram of a MUD-aided DFH receiver configured with no iteration in accordance with an embodiment of the present invention. As previously discussed, the receiver includes an initial DFH decoder module 510 and an interference cancellation and MA-DFH re-decode module 530. There is no iteration controller module employed in this embodiment. Alternatively, although there may be an iteration controller, only a single iteration is carried out (e.g., where the iteration controller is configured as a feed-through to output 565, thereby reducing processing time due to iteration).

In this particular example, the signal received at line 400 includes both a target signal (e.g., user 1) and two interfering signals (e.g., users 2 and 3). The received signal is provided to the frequency detector module 410 that determines which frequency or frequencies are present during each time interval. In one embodiment, the frequency detector module 410 is configured as a spectrogram. Other known frequency detection techniques can be employed here as well.

The set of detected frequencies is provided at line 420 to a bank of trellis decoder modules 430, where there is one trellis decoder for each received user. Each trellis decoder module 430 determines a soft-decision estimate of the corresponding transmitted data bit. Each estimate is then provided at the corresponding line 435. It will be appreciated that the soft decision trellis decoding for each user can be performed in parallel by distinct decoder modules as shown, or one at a time with a single decoder module. The previous discussions on trellis decoder embodiments and functionality in reference to FIGS. 4 and 5 equally apply here.

After the initial DFH detection is performed by module 510, the successfully decoded symbols from interfering users provided on line 435 are received at the interference cancellation and re-decoding module 530. Here, the decoded symbols from interfering users are received at respective interference cancellation (IC) modules 640. Each IC module 640 is adapted to remove the decoded symbols contributed to the received matrix by interfering users.

Conventional other-user interference cancellation techniques can be employed here (e.g., turboMUD or other known MUD algorithms). In one particular embodiment, each module 640 employs the same-system interference cancellation techniques described in U.S. application Ser. No. 10/482,599, filed Dec. 23, 2003, and entitled "Cross-System Interference Cancellation for Multicarrier CDMA and OFDM". This application is a National Stage of International Application No. PCT/US03/20484, filed Jun. 30, 2003, and is herein incorporated by reference in its entirety.

Each interference cancellation module 640 provides an interference-cancelled matrix at a corresponding line 645. A corresponding soft decision trellis decoder module 650 then uses the modified matrix to re-decode the ambiguous received values for the remaining detections in the time-frequency matrix. The updated decoded values are provided on a respective line 540. As no iteration is employed here, those decoded values are final, and can be provided on their intended destination (e.g., such as a local host or network).

Figure 6B:
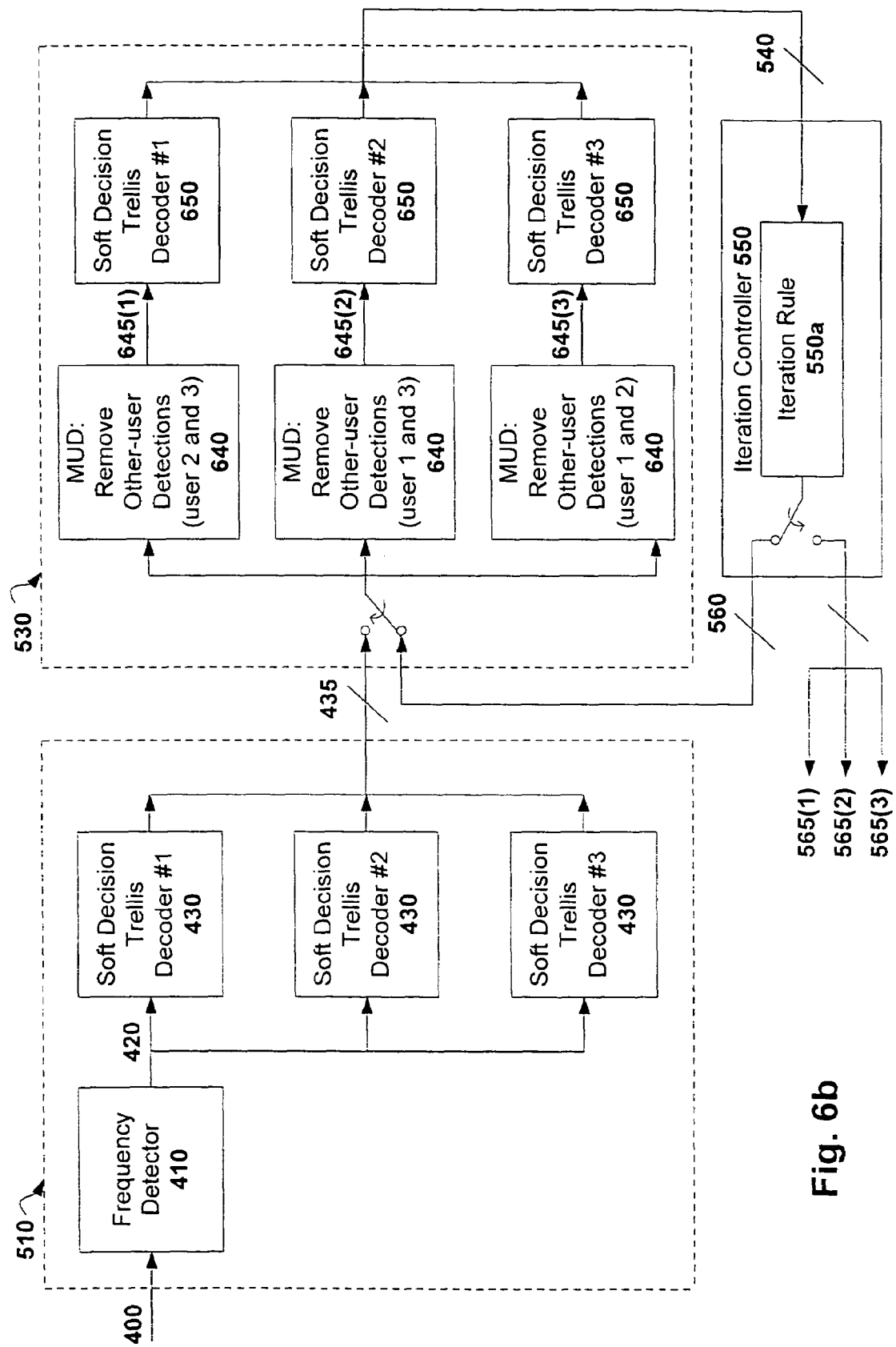
FIG. 6b is a detailed block diagram of a MUD-aided DFH receiver configured with iteration in accordance with an embodiment of the present invention.

FIG. 6b is a detailed block diagram of a MUD-aided DFH receiver configured with iteration in accordance with an embodiment of the present invention. The operation here is similar to that discussed in reference to FIG. 6a, except that the updated decoded values output on lines 540 are provided to the iteration controller module 550, which operates pursuant to an iteration rule 550a. The iteration controller module 550 decides according to the iteration rule 550a whether to pass the data estimates back for more MUD and re-decoding on lines 560, or to output the data estimates as final estimates on lines 565. The previous discussions relevant to the iteration controller and iteration rule equally apply here.

Note that the feedback path allows the input to the module 640 to be effectively switched from lines 435 to lines 560 so that iterative processing and refinement of the data estimates can take place. During such iteration, note that the a "next" set of estimates provided on lines 435 by the initial DFH decoder module 510 can be buffered or otherwise preserved until the iterative processing of the "current" estimates are finalized by the MA-DFH re-decode module 530.

Each of the components illustrated in FIGS. 6a and 6b can be conventionally implemented in hardware, software, firmware, or some combination thereof. For example, each module can be implemented as a set of software instructions executing on a digital signal processor or other suitable processing environment. Alternatively, each module can be implemented in purpose built silicon, such as one or more ASICs configured to provide the described functionality. Alternatively, the described functionality can be coded on a processor readable medium (e.g., such as a server, disk, or other computer program product) as one or more routines.

Embodiments of the present invention provide an umber of advantages, including improved bit error rat (BER) performance for the same number of users, when compared to DFH. Also, an increase in the number of allowable users is enabled without affecting the BER performance. Thus, multiuser detection techniques are combined to differential frequency hopping systems, thereby increasing the number of simultaneous users that may operate in the same area without degradation of the decoded data.

Figure 7:
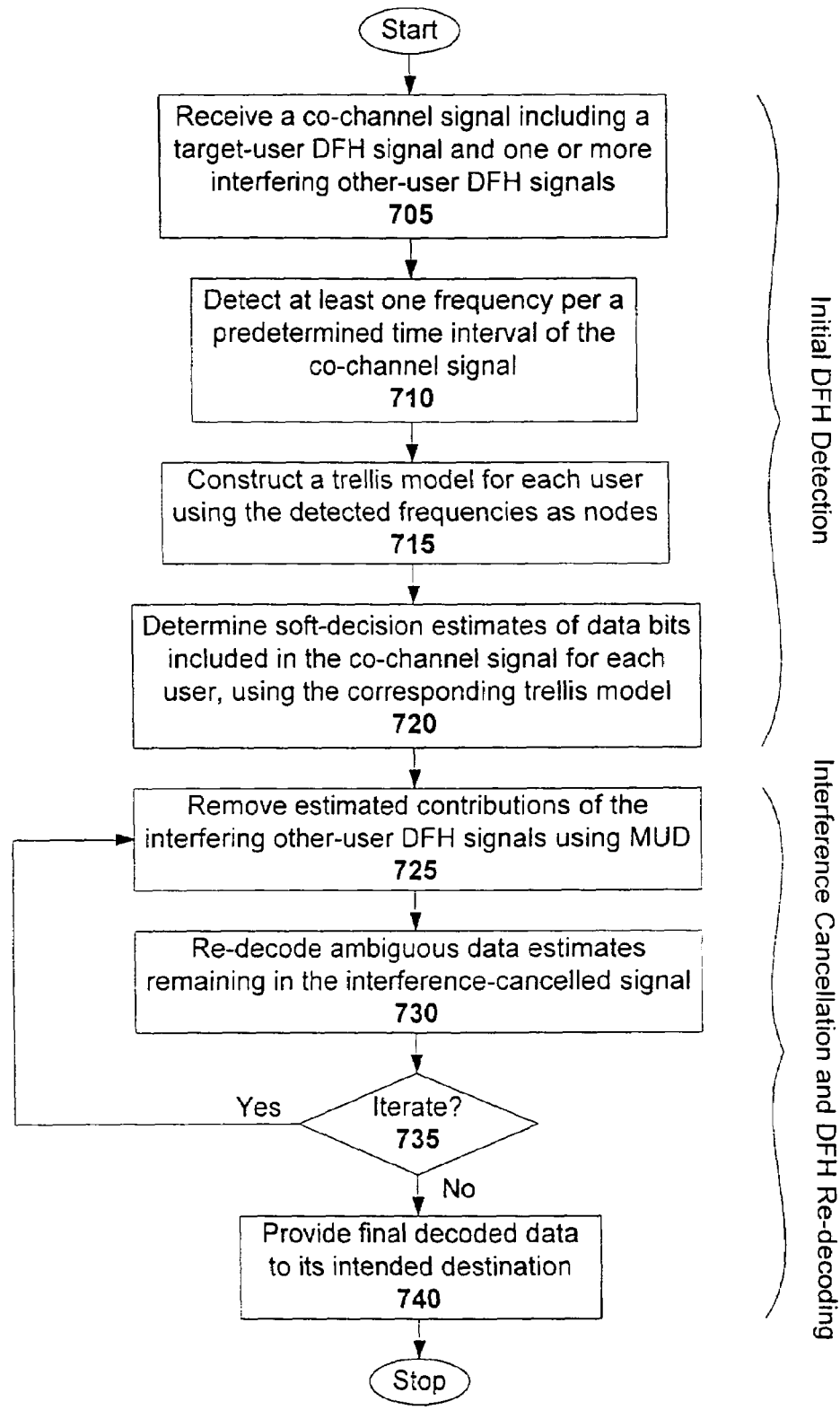
FIG. 7 is a flow chart illustrating a method for receiving a DFH signal in a multiuser communication system in accordance with an embodiment of the present invention.

FIG. 7 is a flow chart illustrating a method for receiving a DFH signal in a multiuser communication system in accordance with an embodiment of the present invention. This method can be carried out, for example, by the receiver discussed in reference to FIG. 6a or 6b.

As can be seen, the method includes an initial DFH detection portion, as well as an interference cancellation and DFH re-decoding portion. The initial DFH detection portion of the method begins with receiving 705 a co-channel signal including a target-user DFH signal and one or more interfering other-user DFH signals. The method proceeds with detecting 710 at least one frequency per a predetermined time interval of the co-channel signal, and constructing 715 a trellis model for each user using the detected frequencies as nodes. The initial DFH detection portion of the method continues with determining 720 soft-decision estimates of data bits included in the co-channel signal for each user, using the corresponding trellis model.

The interference cancellation and DFH re-decoding portion then proceeds with removing 725 estimated contributions of the interfering other-user DFH signals using MUD (e.g., conventional multiuser detection techniques may be employed here, such a turboMUD), and re-decoding 730 ambiguous data estimates remaining in the interference-cancelled signal. A determination 735 can then be made as to whether iteration is likely to improve the quality of the estimated signal. As previously explained, when iteration is employed, a rule of iteration can be used in the determination. If iteration is required, then the data estimates are subjected to the interference cancellation and re-decoding of steps 725 and 730. Otherwise, the iterating process stops, and the final decoded data is provided 740 to its intended destination.

The foregoing description of the embodiments of the invention has been presented for the purposes of illustration and descriptions. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for receiving a differential frequency hopped (DFH) signal in a multiuser communication system, the method comprising:
   receiving a co-channel signal including a target-user DFH signal and one or more interfering other-user DFH signals;
   detecting at least one frequency per a predetermined time interval of the co-channel signal;
   constructing a trellis model for each user using detected frequencies as nodes;
   determining soft-decision estimates of data bits included in the co-channel signal for each user, using the corresponding trellis model;
   removing estimated contributions of the interfering other-user DHF signals using multiuser detection (MUD), thereby providing an interference-cancelled signal; and
   re-decoding ambiguous data estimates remaining in the interference-cancelled signal.

2. The method of claim 1 further comprising:
   in response to determining iteration is likely to improve the quality of the re-decoded data estimates, repeating the removing and re-decoding.

3. The method of claim 1 further comprising:
   in response to determining iteration is not likely to improve the quality of the re-decoded data estimates, providing the re-decoded data estimates as final decoded data.

4. The method of claim 1 further comprising:
   repeating the removing and re-decoding one or more times.

5. The method of claim 1 further comprising:
   providing the re-decoded data estimates as final decoded data.

6. The method of claim 1 wherein determining the soft-decision estimates includes generating estimates of the data bits based on a cumulative soft-valued metric.

7. The method of claim 1 wherein determining the soft-decision estimates includes providing a confidence value for each estimate.

8. The method of claim 1 wherein further comprising:
   inferring missing nodes of the trellis model from existing nodes based on detected frequencies; and
   correcting for burst errors.

9. A system for receiving in a multiuser communication environment a co-channel signal including a target-user differential frequency hopped (DFH) signal and one or more interfering other-user DFH signals, the system comprising:
   an initial DFH decoding module adapted to detect at least one frequency per a predetermined time interval of the co-channel signal, thereby enabling construction of a trellis model for each user using detected frequencies as nodes, and to determine soft-decision estimates of data bits included in the co-channel signal for each user, using the corresponding trellis mode; and
   an interference cancellation and re-decoding module operatively coupled to the initial DHF decoding module, and adapted to remove estimated contributions of the interfering other-user DFH signals using multiuser detection (MUD) thereby providing an interference-cancelled signal, and to re-decode ambiguous data estimates remaining in the interference-cancelled signal.

10. The system of claim 9 wherein the initial DFH decoding module includes:
    a frequency for detecting the at least one frequency per a predetermined time interval of the co-channel signal; and
    one or more soft decision trellis decoders for determining the soft-decision estimates of data bits.

11. The system of claim 10 wherein each soft decision trellis decoder is further adapted to generate estimates of the data bits based on a cumulative soft-valued metric.

12. The system of claim 10 wherein each soft decision trellis decoder is further adapted to provide a confidence value for each estimate.

13. The system of claim 10 wherein each soft decision trellis decoder is further adapted to infer missing nodes of trellis model from existing nodes based on the detected frequencies, and to correct for burst errors.

14. The system of claim 9 wherein the interference cancellation and re-decoding module includes:
    one or more multiuser detectors for removing the estimated contributions of the interfering other-user DFH signals for each user; and
    a corresponding soft detection trellis decoder operatively coupled to each multiuser detector, for re-decoding the ambiguous data estimates remaining in the interference-cancellation signal.

15. The system of claim 9 further comprising:
    an iteration controller operatively coupled to the interference cancellation and re-decoding module, and adapted to provide the re-decoded data estimates for further processing by the interference cancellation and re-decoding module when appropriate, based on an iteration rule.

16. The system of claim 15 wherein in response to determining that iteration is not likely to improve the quality of the re-decoded data estimates, the iteration controller provides the re-decoded data estimates as final decoded data.

17. A method for receiving in a multiuser communication environment a co-channel signal including a target-user differential frequency hopped (DHF) signal and one or more interfering other-user DFH signals, the method comprising:
   decoding the DFH signal, thereby providing soft-decision estimates of data bits included in the co-channel signal for each user;
   removing detection (MUD), thereby providing an interference-cancelled signal; and
   re-decoding ambiguous data estimates remaining in the interference-cancelled signal.

18. The method of claim 17 further comprising:
   repeating the removing and re-decoding one or more times.

19. The method of claim 17 further comprising:
   providing the re-decoded data estimates as final decoded data.

20. The method of claim 17 wherein decoding the DFH signal includes:
   detecting at least one frequency per a predetermined time interval of the co-channel signal;
   constructing a trellis model for each user using detected frequencies as nodes; and
   determining soft-decision estimates of data bits included in the co-channel signal for each user, using the corresponding trellis model.

* * * * *

UNITED STATES PATENT AND TRADEMARK OFFICE
CERTIFICATE OF CORRECTION

PATENT NO. : 6,999,498 B2
APPLICATION NO. : 10/482598
DATED : February 14, 2006
INVENTOR(S) : Diane G. Mills, Geoff S. Edelson and Dianne E. Egnor It is certified that error appears in the above-identified patent and that said Letters Patent is hereby corrected as shown below:

Column 1,
Line 57, delete "(DHF)" insert -- (DFK)--

Column 2,
Line 23, delete "DHF" insert -- DFH--

Column 2,
Line 31, delete "(DHF)" insert -- (DFH)--

Column 2,
Line 34, delete "DHF" insert -- DFH--

Column 2,
Line 42, delete "DHF" insert -- DFH--

Column 3,
Line 31, delete "DHF" insert -- DFH--

Column 4,
Line 34, delete "DHF" insert --DFH--

Column 5,
Line 1, delete "but" insert --bit--

Column 6,
Line 58, delete "DHF" insert -- DFH--

Column 7,
Line 2, delete "DHF" insert -- DFH--

Column 9,
Line 55, delete "DHF" insert -- DFH--

Column 10,
Line 28, delete "mode" insert --model--

Column 10,
Line 30, delete "DHF" insert -- DFH--

UNITED STATES PATENT AND TRADEMARK OFFICE
CERTIFICATE OF CORRECTION

PATENT NO. : 6,999,498 B2
APPLICATION NO. : 10/482598
DATED : February 14, 2006
INVENTOR(S) : Diane G. Mills, Geoff S. Edelson and Dianne E. Egnor It is certified that error appears in the above-identified patent and that said Letters Patent is hereby corrected as shown below:

Column 11,
Line 10, delete "(DHF)" insert -- (DFH)--

Column 11,
Line 15, insert -- estimated contributions of the interfering other-user DFH signals using multiuser-- after the word "removing"

Signed and Sealed this

Twelfth Day of December, 2006

JON W. DUDAS
*Director of the United States Patent and Trademark Office*